United States Patent [19]

Leung et al.

[11] Patent Number: 5,238,250
[45] Date of Patent: Aug. 24, 1993

[54] COMPUTER GAME CONTROL APPARATUS

[75] Inventors: Yiu C. Leung; Iu S. Leung, both of Hong Kong, Hong Kong

[73] Assignee: Bung Electronic Engineering Company, Hong Kong

[21] Appl. No.: 629,132

[22] Filed: Dec. 18, 1990

[30] Foreign Application Priority Data

Jan. 10, 1990 [GB] United Kingdom ................. 9000532

[51] Int. Cl.⁵ .............................................. A63F 9/22
[52] U.S. Cl. .................................. 273/148 B; 273/435
[58] Field of Search ............... 273/433, 434, 435, 437, 273/148 B, DIG. 28, 86 G; 364/410

[56] References Cited

U.S. PATENT DOCUMENTS

| | | | |
|---|---|---|---|
| 4,462,594 | 7/1984 | Bromley et al. | 273/DIG. 28 |
| 4,480,835 | 11/1984 | Williams . | |
| 4,579,338 | 4/1986 | Heffron | 273/DIG. 28 |
| 4,752,068 | 6/1988 | Endo | 273/DIG. 28 |
| 4,844,465 | 7/1989 | Hibino et al. | 273/148 B |
| 4,858,930 | 8/1989 | Sato | 273/DIG. 28 |
| 4,981,296 | 1/1991 | Shiraishi et al. | 273/DIG. 28 |
| 5,014,982 | 5/1991 | Okada et al. | 273/435 |
| 5,112,051 | 5/1992 | Darling et al. | 273/435 |

OTHER PUBLICATIONS

Advertisement, "This Fall . . . NeoGeo", Playmeter Magazine Oct. 1990, pp. 24–25.

Primary Examiner—Jessica J. Harrison
Attorney, Agent, or Firm—Merchant Gould Smith Edell Welter & Schmidt

[57] ABSTRACT

A computer game system comprises a computer game control apparatus for connection between a game computer having a microprocessor and a computer game program carrier via corresponding signal communication buses. The computer game control apparatus comprises an address decoder, a data comparator, an address-and-data mapping device, a multiplexer and a storage assembly for saving and restoring the computer game status.

13 Claims, 3 Drawing Sheets

COMPUTER GAME CONTROL APPARATUS

FIELD OF THE INVENTION

The present invention relates to computer game control apparatus.

BACKGROUND OF THE INVENTION

Computer game programs are run on a computer game system which comprises a game computer having a microprocessor for executing the program, an input device such as a joystick for a user to control the execution of the program, and an output device such as a monitor or television set (VDU) for providing the user with visual and audio output signals. The programs are usually stored on magnetic tape, on floppy disks or compact disks, or in ROM cards which are generally referred to as cartridges, so that different computer games can be played.

In systems using a cartridge, the game computer and the cartridge are provided with complementary connectors, such as pin or slot connectors, for connecting together their corresponding address, data and control buses The connectors are separable so that the cartridge can be replaced by another one carrying a different game program.

A typical computer game is divided into different levels or stages and normally starts to play from the beginning of level one. Some computer games provide a CONTINUE function which allows a user to start the games from the beginning of a particular level which the user has managed to reach in the previous play. However, the CONTINUE function is usually available only for a limited number of times, and the user is not allowed to start the game at any desired instant within the level previously reached. Once the CONTINUE function is no longer available, the user must start the game from the beginning of level one. Even when the CONTINUE function is still available, the user has to go through again the beginning part of the last level which has previously been successfully played.

SUMMARY OF THE INVENTION

The present invention provides in a computer game system including a game computer and a computer game program carrier, both having respective signal communication buses, which can be connected together to enable the game computer to execute the computer game program stored in the carrier, a computer game control apparatus for use between said signal communication buses, which control apparatus comprises saving means for saving data appearing at said signal communication buses at any desired time during the execution of a said computer game program in a said game computer, said data representing the prevailing execution conditions of said computer game program at that desired time, and restoring means for restoring the previously stored data in a said game computer and/or computer game program carrier to enable a said computer game program to restart execution of the game from the execution conditions corresponding to said data at a later desired time Preferably, the apparatus further comprises memory means into which said data can be saved by said saving means and from which said data can be retrieved by said restoring means, and a multiplexer which is operable to connect selectively said memory means or a said computer game program carrier to a microprocessor of a said game computer via corresponding signal communication buses.

It is preferred that said saving and restoring means are provided on the signal communication buses connecting together a said microprocessor and the multiplexer, and comprise an address decoder operable on control and address signals appearing on said buses, a data comparator operable on control and data signals appearing on said buses, and an address-and-data mapping device operable on control, address and data signals appearing on said buses.

In a preferred embodiment, an output of the address decoder is connected to corresponding inputs of the data comparator and the address-and-data mapping device, and corresponding outputs of the data comparator and the address-and-data mapping device are in turn connected to and control the operation of the multiplexer.

Preferably, said memory means comprises a ROM unit and a RAM unit which are connected to the multiplexer via signal communication buses, the RAM unit being also connected to the address-and-data mapping device via signal communication buses.

It is preferred that the RAM unit be connected to the multiplexer and to the address-and-data mapping device by means of a multiplexer.

In a preferred embodiment, said saving means is operable to save a plurality of sets of said data, each set of said data being corresponding to the execution conditions of a said computer game program at a different desired time, and said restoring means is operable to restore said plurality of sets of said data in turn in a said game computer and/or computer game program carrier to enable a said computer game program to start execution of the game from different execution conditions sequentially for different time intervals.

Preferably, the apparatus further comprises a timer control which is operable to determine the length of the time intervals during each of which a said computer game program is executed from corresponding different execution conditions.

It is preferred that the apparatus further comprises time delay means which is operable to introduce time delay intervals into and thereby to slow down the execution of a said computer game program in a said game computer.

In a preferred embodiment, said time delay means is provided by the timer control.

Preferably, the timer control is also provided on the signal communication buses connecting together a said microprocessor and the multiplexer, and is operable on control signals appearing on said buses.

BRIEF DESCRIPTIONS OF THE DRAWINGS

The details of the preferred embodiment of the present invention will be described in connection with the accompanying drawings, in which:

FIG. 1 is a schematic block diagram showing various components of the preferred embodiment of a computer game control apparatus according to the present invention; and FIGS. 2A and 2B are consecutively flow charts of a computer control program stored in and for use with the control apparatus of FIG. 1.

DETAILED DESCRIPTION

Figure 1:
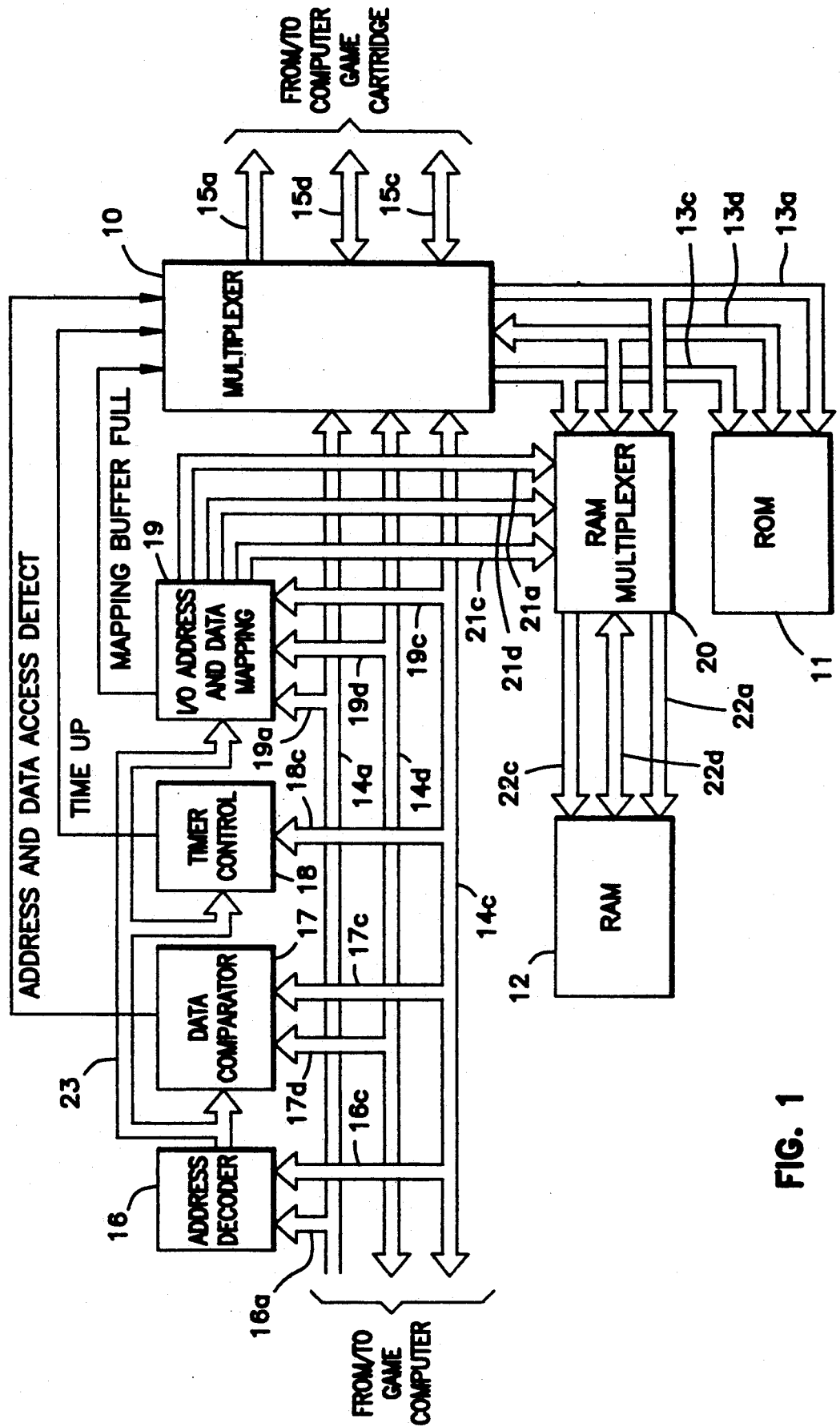

The computer game control apparatus embodying the invention shown in FIG. 1 is adapted to be used between a game computer (not shown) and a cartridge (not shown) carrying a computer game program. The game computer generally contains a circuit which is formed by a microprocessor, read-only-memory (ROM), random-access-memory (RAM), registers, signal communication buses and other components, whereas the cartridge generally contains ROM in which the game program is stored, an auxiliary circuit including ROM, RAM and registers for controlling read/write operations, and signal communication buses.

Complementary connectors are provided on the game computer and the cartridge, respectively, which can be mated together to connect the corresponding buses to enable the game program in the cartridge to be accessed by the circuitry of the game computer.

As shown in FIG. 1, a computer game control apparatus forming the preferred embodiment of the invention comprises a multiplexer 10, a ROM unit 11, a RAM unit 12, a RAM multiplexer 20, and five sets of signal communication buses 13, 14, 15, 21 and 22, each set consisting of an address bus, a data bus and a control bus denoted by suffixes a, d, and c respectively. The buses 22 are provided between the RAM unit 12 and the RAM multiplexer 20. The buses 13 are connected at one end to the multiplexer 10 and at the other end to both the ROM unit 11 and the RAM multiplexer 20. The buses 14 are connected at one end to the multiplexer 10 and terminate at the other end with a connector (not shown) which in use is mated with the connector of the game computer. The buses 15 are connected at one end also to the multiplexer 10 and terminate at the other end with another connector (not shown) which is to be mated with the aforesaid connector of the cartridge. The computer game control apparatus is thus connected in use between the game computer and the cartridge, providing communication between the game computer and the cartridge.

The apparatus further comprises and address decoder 16, a data comparator 17, a timer control 18 and a mapping device 19, each of which is arranged to pick up control signals from the control bus 14c via a corresponding bus 16a, 17a, 18a or 19a respectively The address decoder 16 is arranged also to pick up address signals from the address bus 14a via a bus 16b, and the data comparator 17 is arranged also to pick up data signals from the data bus 14d via a bus 17b, whereas the mapping device 19 is arranged also to pick up both address and data signals via buses 19b and 19c respectively. The address decoder 16 has an output bus 23 which is connected to the input of each of the data comparator 17, the timer control 18 and the mapping device 19. Each of these components 17 to 19 has in turn a single output terminal connected to a corresponding input terminal of the multiplexer 10, and controls the operation of the multiplexer 10 either to connect the buses 14 to the buses 15, thereby enabling the cartridge, or to the buses 13 thereby disabling the cartridge. The mapping device 19 controls the RAM multiplexer 20 via the buses 21.

The operation of the computer game control apparatus will now be described. When the cartridge is connected to the game computer and is enabled by the multiplexer 10, the ROM of the cartridge storing the game program and its auxiliary circuit are combined with the game computer circuit in which the microprocessor can access the cartridge ROM in order to execute the program. Execution of the program will result in some or all of the microprocessor registers and some or all of the RAM and registers of the remainder of the combined circuit being used, namely they will have "contents" in them. The contents of all such used RAM and registers at a particular instance represent the status of the game, or in other words the point up to which the game program has been executed, at that particular instance.

The game computer includes a video control circuit which in use generates a periodic interrupt signal to the microprocessor to refresh the picture on the screen of the VDU.

In order to begin a game from a selected game status at a later time, the selected status must be saved in a previous game. This can be achieved by saving into the RAM unit 12 the contents of the concerned RAM and registers at the instance at which the selected status is prevailing, under the control of a control program which is stored in the ROM unit 11 of the control apparatus. The control program is executed by the microprocessor of the game computer via the buses 13 and 14 which the cartridge is disabled by the multiplexer 10.

The microprocessor is triggered to execute the control program by a user by means of a joystick connected to the game computer, the joystick connected to the game computer, the joystick performing a write operation by putting a predetermined constant value into a particular flag register of the control apparatus. Before the microprocessor is to be so triggered, it is firstly interrupted by the next interrupt signal generated by the video control circuit of the game computer. By virtue of the interrupt function, the microprocessor saves the contents of its registers and the RAM and other registers of the game computer and the cartridge currently used for executing the game program into the RAM unit 12 under control of the control program. The microprocessor will resume execution of the game program, from where the program is interrupted, immediately after the control program terminates execution and the multiplexer 10 enables the cartridge.

Once an appropriate address signal appears on the address bus 14a and is picked up by the address decoder 16, the decoder 16 will send a chip select signal via the bus 23 to the data comparator 17, the timer control 18 and the mapping device 19. Depending on the chip select signal, the data comparator 17 will compare the magnitude of the data simultaneously picked up from the data bus 14d with a constant value or with that of the content of a particular register of the auxiliary circuit of the control apparatus. Or alternatively, the data comparator 17 will firstly perform a logic operation between the said data and the content of said particular register, and subsequently compare the magnitude of the said data with that of another particular cartridge. Finally, the data comparator will send an output signal corresponding to the result of its operation to the multiplexer 10. Depending on the said result, the content of the aforesaid register or registers may be modified for next comparison or logic operation on a subsequent appropriate address signal and its corresponding data signal.

The user may also cause the joystick to perform a read operation during the execution of the computer game program. When this occurs, the address decoder 16 will send a chip select signal to the data comparator 17 which will in turn compare the data simultaneously picked up from the data bus 14d with a particular constant value or the content of the particular register to determine whether to cause the multiplexer 10 to disable the cartridge at the next interrupt signal generated by the video control circuit.

Depending on the chip select signal, the mapping device 19 will determine whether to save either one or both of the signals appearing on the address and the data buses 14a and 14d, or not to save them at all. into the RAM unit 12 via the buses 21 and the RAM multiplexer 20. The signal data can, depending on their nature, be sequentially saved into a particular area of the RAM unit 12. In the former case, the mapping device 19 will, when the particular area of the RAM unit 12 is full, send an output signal to the multiplexer 10 to disable the cartridge and start the execution of the control program at the next interrupt signal generated by the video control circuit. In the latter case, the contents of said another area of the RAM unit 12 will be replaced by new data when they are accessed again. Accordingly, it is clear that the output signal via the buses 21 from the mapping device 19 signifies the completion of the saving operation of the game status of the control apparatus.

To start a new game from the saved game status, the microprocessor is triggered by the user by means of the joystick through which a predetermined constant value is put in the flag register. The flag register is accessed when the next interrupt signal generated by the video control circuit occurs, and at the same time the control of the microprocessor is taken over by the control apparatus to execute the control program. At this time, it will be appreciated that the cartridge is disabled. The control program operates to transfer the new game status from the RAM unit 12 to the aforesaid RAM and registers of the game computer and the cartridge circuit, thereby replacing the current game status with the new game status. When the transfer is completed, the control program will set a particular address to a specific constant value to enable the address decoder 16 and the data comparator 17, and will then send an output signal to the multiplexer 10. The multiplexer 10 in turn enables the cartridge to resume control over the microprocessor which starts the game program from the new game status. In other words, the previously stored game status, i.e. the new game status is restored.

Apart from the game status saving and restoring functions, the control apparatus has a further function of running sequentially different segments of a computer game. This function is achieved by saving in the RAM unit 12, the game status at the beginning of all the different segments, and then by sequentially restoring the saved game status at different times. It will be appreciated that the game will be run from a particular game status when the latter is restored, and will terminate when the next game status is restored. The running time of each game segment is determined by the timer control 18.

The timer control 18 operates in the following manner. When the address decoder 16 picks up an appropriate address signal from the address bus 14a during the running of a particular game segment, the timer control 18 will receive a chip select signal from the address decoder 16. The timer control 18 then checks whether the data signal picked up from the data bus 14d has a predicted change. Such a change may correspond to the change from one complete picture to another on the screen on the VDU. If a predicted change is detected, the content of a counter of the timer control 18 is reduced by one. These detecting and counting down operations will continue until the counter content is reduced to zero, whereupon the timer control 18 sends an output signal to the multiplexer 10. The multiplexer 10 will then disable the cartridge, thereby terminating the running of the particular game segment. The microprocessor then, under the control of the control program, resets the counter of the timer control 18, restores the next game status and enables, via the multiplexer 10, the cartridge to resume control over the microprocessor which starts the game program from the newly restored game status. The timer control 18 then resumes operation, and the whole process repeats for all the subsequent game segments. With this function, the control apparatus allows a user to prepare a summary run down of the game program.

The timer control 18 also enables the control apparatus to perform a further function of running a computer game in slow motion. This function operates in the following manner. During the execution of the game program, the microprocessor is interrupted by the counter in the timer control 18 when the counter counts down to zero. At this time, the control program is executed to perform an idling loop, until the beginning of the next video screen, in order to provide a predetermined time delay, and at the same time resets the counter of the timer control 18 to the original value. At the end of the time delay, the cartridge is enabled again, thereby allowing the microprocessor to resume execution of the game program from where it was interrupted. The counter of the timer control 18 then starts to count down in response to the chip select signals received from the address decoder 16, as described above. When the counter content is reduced to zero, the microprocessor is interrupted again. Accordingly, the reset value of the counter determines the running time of each of the segments of the game, which are separated by the predetermined time delay. The introduction of the time delay in the running of the game provides a slow motion effect which can be adjusted by modifying the reset value of the counter, or in other words by the frequency of the introduction of the time delay.

Figure 2A:
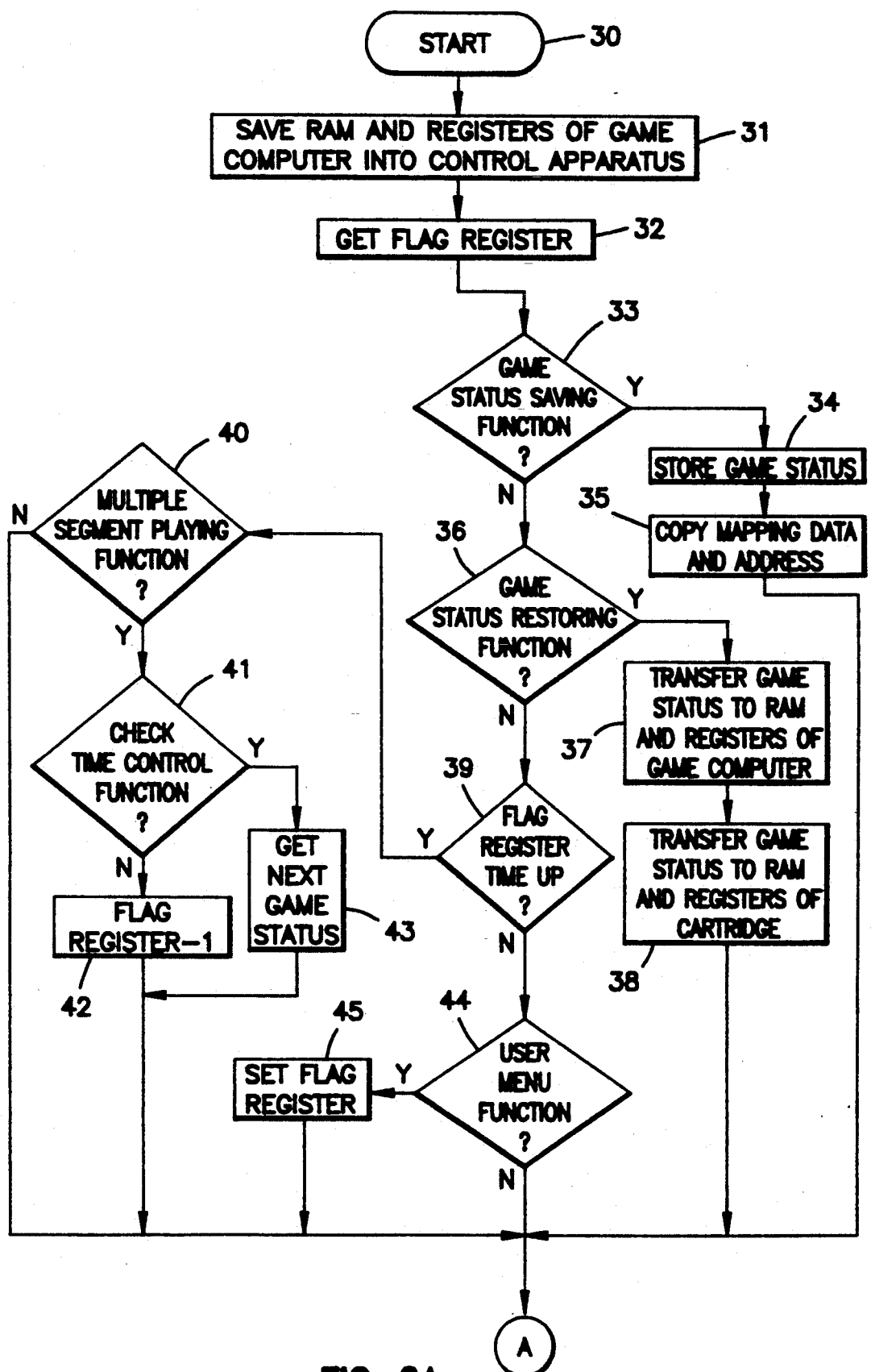
Figure 2B:
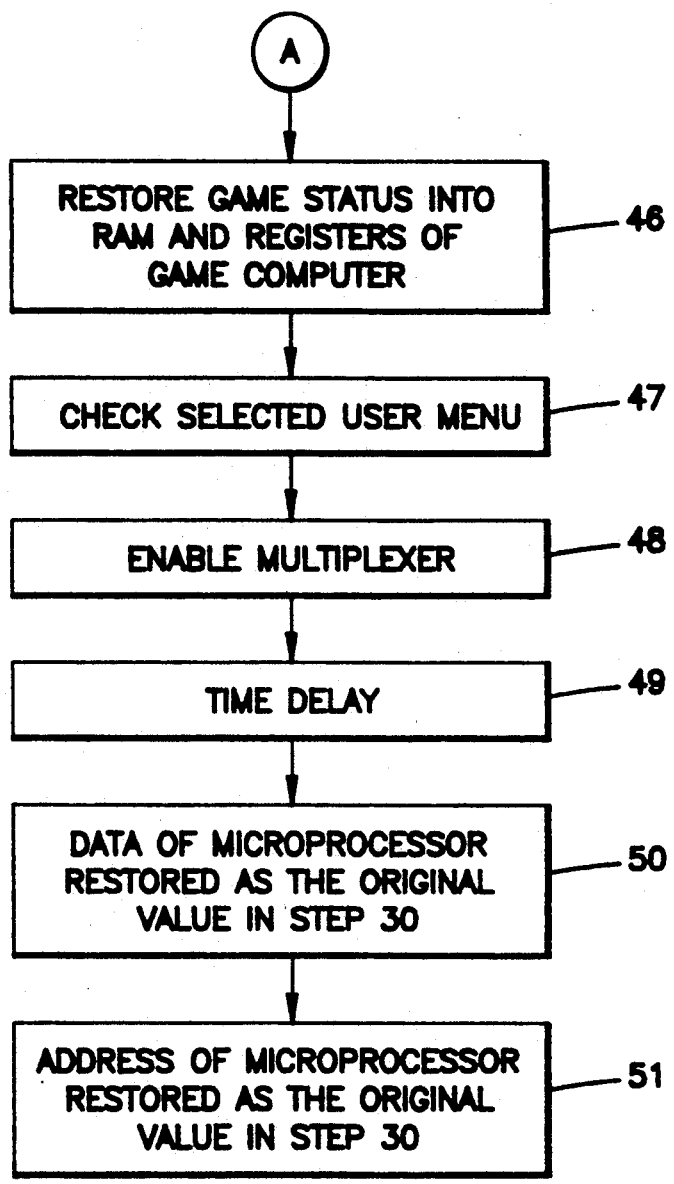

FIGS. 2A and 2B are consecutively flow charts showing the principal execution steps of the control program. The control program starts execution from an initial step 30 at the time when the microprocessor receives an interrupt signal generated by the video control circuit of the game computer. The contents of specific registers and RAM of the game computer are firstly saved, in step 31, into a preserved area of the RAM unit 12 for later use by the control program. The content of the flag register of the control apparatus is then checked in step 32, said content determining subsequently sub-routines of the control program to be executed.

Where the flag register content represents a game status saving function, as in step 33, the data in the RAM of the game computer and of the cartridge are firstly stored, as in step 34, in a preserved area of the RAM unit 12. Then mapping device from a specific area of the RAM unit 12 are copied, in step 35, to the said preserved area, said mapping data representing the values of registers, being typically a set of write-only registers, of the game computer and the cartridge. This subroutine terminates at step 46.

Where the flag register content represents a game status restoring function, as in step 36, the contents of the aforesaid preserved area of the RAM unit 12 are transferred to the said RAM and said set of registers, as in steps 37 and 38 respectively, of the game computer and the cartridge, thereby restoring the contents of the said RAM and said set of registers or the previously saved game status. This sub-routine terminates at step 46.

Where the flag register content represents a time-up function, as in step 39, of the timer control 18, ie its counter counting down to zero, then whether the control apparatus is operating in the multiple segment playing mode is checked, as in step 40. The sub-routine terminates at step 46 if the control apparatus is not in the said mode, otherwise it proceeds to step 41 in which the output of the timer control 18 is checked. If a time-up output signal has not yet been given by the timer control 18, the counter content of the timer control 18 is reduced by one, as in step 42, and the sub-routine terminates at step 46. On the other hand, if a time-up output signal is present, the sub-routine proceeds to step 43 in which the game status of for the next game segment is reduced in the said RAM and said set of registers of the game computer and the cartridge, and the sub-routine subsequently terminates at step 46.

Where the flag register content represents a user function menu display function, as in step 44, a user function menu is displayed to permit the user to select one from the available functions, such as slow motion, multiple game segment playing, etc. When a particular user function is selected, the flag register is set accordingly, and the sub-routine terminates at step 46.

In step 46, the specific RAM of the game computer, mentioned in relation to step 31 above, is restored to its original content which is retrieved back from the preserved area of the RAM unit 12. The next step is denoted by 47 in which the content of the flag register is checked to see if it has been set by the user function menu operation in step 46 to initiate a particular value of the counter of the timer control 18 to suit the request for slow motion function and/or multiple game segment displaying function. This is followed by step 48 in which a particular value is set to a specific address to cause the multiplexer 10 to enable the cartridge again, and then by step 48 in which a delay in time, depending on the video screen scanning time, is provided until the beginning of the next video screen. Finally, the data of the microprocessor are restored in step 50 to the original value prevailing at the time of entry (step 30) of the control program, and in subsequent step 51 the address is returned to where the game program was interrupted.

Various modifications can be made to the described embodiment without departing from the scope of the invention. For example, the game programs may be stored on floppy disks, and in this case the computer game control apparatus is to be connected between the computer unit and the disk drive. Also, the RAM and register contents representing a game status can be stored on a magnet disk, instead of RAM, for permanent storage.

What we claim is:

1. A computer game system comprising:
   (a) a game computer;
   (b) a computer game program carrier for storing a computer game program;
   (c) the game computer and the computer game program carrier having signal communication buses connected therebetween, to enable the game computer to execute a computer game program stored in the computer game program carrier;
   (d) a computer game control apparatus connected between said signal communication buses, the apparatus comprising:
   (i) saving means for saving data appearing at said signal communication buses at any desired time during the execution of a computer game program in said game computer, said data representing the prevailing execution conditions of said computer game program at the desired time;
   (ii) restoring means for restoring the previously stored data in said game computer and/or said computer game program carrier to enable the computer game program to restart the game from the execution conditions corresponding to said data at a later desired time;
   (iii) memory means into which said saving means saves said data and from which said restoring means retrieves said data;
   (iv) a multiplexer connecting selectively from said memory means or said computer game program carrier to a microprocessor of said game computer via corresponding signal communication buses;
   (v) an address decoder operating upon control and address signals appearing on said signal communication buses;
   (vi) a data comparator operating upon control and data signals appearing on said signal communication buses; and
   (vii) an address-and-data mapping device operating upon control, address and data signal appearing on said signal communication buses.

2. A computer game system according to claim 1 wherein an output of the said address decoder is connected to corresponding inputs of the said data comparator and the said address-and-data mapping device, and corresponding outputs of the said data comparator and the said address-and-data mapping device are in turn connected to and control the operation of the said multiplexer.

3. A computer game system apparatus according to claim 2 wherein said memory means comprises a ROM unit and a RAM unit which are connected to the said multiplexer via said signal communication buses, the RAM unit being also connected to the said address-and-data mapping device via said signal communication buses.

4. A computer game system apparatus according to claim 3 wherein the RAM unit is connected to the said multiplexer and to the said address-and-data mapping device by means of a RAM multiplexer.

5. A computer game control apparatus according to claim 1 wherein said saving means saves a plurality of sets of said data, each set of said data being corresponding to the execution conditions of a said computer game program at a different desired time, and said restoring means restores said plurality of sets of data in turn in a said game computer and/or computer game program carrier to enable a said computer game program to start execution of the said game from different execution conditions sequentially for different time intervals.

6. A computer game control apparatus according to claim 5 further comprising a timer control for determining the length of the time intervals during each of which a said computer game program is executed from corresponding different execution conditions.

7. A computer game control apparatus according to claim 6 further comprising time delay means for introducing time delay interval into and thereby to slow down the execution of a said computer program in a said computer, wherein said time delay means is provided by the said timer control.

8. A computer game control apparatus according to claim 1 further comprising time delay means for introducing time delay interval into and thereby to slow down the execution of a said computer program in a said computer.

9. A computer game system apparatus according to claim 1, further comprising:
 (a) a timer control for determining the length of the time intervals during each of which a said computer game program is executed from corresponding different execution conditions; and
 (b) time delay means for introducing time delay intervals into and thereby to slow down the execution of a said computer game program in a side game computer, which said time delay means is provided by the timer control, and the said timer control is also provided on the means for signal communication connecting together a said microprocessor and the said multiplexer, and operate upon control signals appearing on said signal communication buses.

10. A computer game control apparatus for connection between a game computer having a microprocessor and a computer game program carrier via corresponding signal communication buses, the apparatus comprising:
 (a) an address decoder;
 (b) a data comparator;
 (c) a ROM containing a control program;
 (d) a multiplexer which enables the game computer to execute, via the signal communication buses, a computer game program in the computer game program carrier, and which the multiplexer, when activated by the address decoder and the data comparator at a predetermined period of time after appearance of data or a plurality of sets of data in a predetermined time interval, enables the game computer to execute, via the signal communication buses, the control program in the ROM; and
 (e) software control switch storage means for storing all data which have appeared in the signal communication buses at any desired instance during execution of the computer game program and which has been written in designated write-only software control switches in the game computer and computer game program carrier, wherein such data, together with all the data in registers of the microprocessor of the game computer, and in a RAM and readable software control switches of the game computer and computer game program carrier at any instance, represent the status of the execution of the computer game program at the instance.

11. A computer game control apparatus according to claim 10, further comprising a memory and a software storage means and wherein the multiplexer connects selectively between the memory and the computer game program carrier, via respective signal communication buses, to the microprocessor, such that when the multiplexer is activated and the software storage means in the ROM is executed, all the data in the software control switch storage means, in the readable software control switches, in the registers of the microprocessor and in the RAM at the instance can be stored in the said memory, and further comprising a software restoration means for reading, at a later desired time, all such data stored in the memory and writing all such data respectively back to the software control switches, the registers of the microprocessor and the RAM such that the computer game program is hence executed from the status as at the first said desired instance.

12. A computer game control apparatus according to claim 11, wherein the said software control switch storage means has communication buses for connecting the microprocessor and the multiplexer and includes an address decoder operating upon control and address signals appearing on the respective buses, a comparator operating upon control and data signals appearing on the respective buses, and an address and data mapping device operating upon control, address and data signals appearing on the respective buses.

13. A computer game control apparatus according to claim 10, further including time delay means for introducing time delay intervals and thereby to slow down the execution of the computer game program, such that during a slowed down time intervals, the multiplexer enables the game computer to be connected via corresponding signal communication buses to the computer game program carrier and thereby to execute the computer game program therein and when a slow down time function is terminated, the multiplexer is activated and enables the game computer to execute, via the signal communication buses, the control program in the ROM, which control program executes a variable time delay program such that by changing the proportion between the delay time in the time delay means and that in the time delay program, the computer game program can be executed at different and variable slowdown speed.

* * * * *

UNITED STATES PATENT AND TRADEMARK OFFICE
CERTIFICATE OF CORRECTION

| | | |
|---|---|---|
| PATENT NO. : | 5,238,250 | |
| DATED : | August 24, 1993 | |
| INVENTOR(S) : | Yiu C. Leung et al. | |

It is certified that error appears in the above-identified patent and that said Letters Patent is hereby corrected as shown below:

Cover page, item (30) after Foreign Application Priority Data "9000532" should read --9000532.3--.

Column 8, line 45 delete "apparatus" after the word "system".

Column 8, line 52 delete "apparatus" after the word "system".

Column 8, line 56 "control apparatus" should read --system--.

Column 8, line 66 "control apparatus" should read --system--.

Column 9, line 3 "control apparatus" should read --system--.

Column 9, line 9 "control apparatus" should read --system--.

Column 9, line 14 delete "apparatus" after the word "system".

UNITED STATES PATENT AND TRADEMARK OFFICE
CERTIFICATE OF CORRECTION

PATENT NO. : 5,238,250
DATED : August 24, 1993
INVENTOR(S) : Yiu C. Leung, et. al.

It is certified that error appears in the above-indentified patent and that said Letters Patent is hereby corrected as shown below:

Column 9, line 27 "operate" should read --operates--.

Signed and Sealed this

Nineteenth Day of July, 1994

Attest:

BRUCE LEHMAN

Attesting Officer     Commissioner of Patents and Trademarks